United States Patent [19]

Shoureshi

[11] Patent Number: 5,564,537

[45] Date of Patent: Oct. 15, 1996

[54] ADAPTIVE-PASSIVE VIBRATION CONTROL SYSTEM

[75] Inventor: Rahmat A. Shoureshi, West Lafayette, Ind.

[73] Assignee: Cooper Tire & Rubber Company, Findlay, Ohio

[21] Appl. No.: 222,085

[22] Filed: Apr. 4, 1994

[51] Int. Cl.$^6$ ....................................................... F16F 7/10
[52] U.S. Cl. .......................... 188/380; 267/136; 267/175
[58] Field of Search ....................................... 188/378, 379, 188/380, 279; 267/136, 137, 141, 195, 291, 175, 177, 182, 140.11, 140.13; 248/560, 562, 566, 636, 550

[56] References Cited

U.S. PATENT DOCUMENTS

| | | | |
|---|---|---|---|
| 3,606,233 | 4/1968 | Scharton et al. | 248/550 |
| 4,140,868 | 2/1979 | Tuttle | 188/380 X |
| 4,483,425 | 11/1984 | Newman | 248/550 X |
| 5,127,622 | 7/1992 | Whelpley et al. | 267/136 X |

FOREIGN PATENT DOCUMENTS 2547955  5/1977  Germany ............... 188/379

Primary Examiner—Robert J. Oberleitner
Assistant Examiner—Peter M. Poon
Attorney, Agent, or Firm—Joseph G. Nauman

[57] ABSTRACT

A passive/adaptive vibration control system is provided wherein various elements of the system may be adapted on-line in response to sensed vibrations. A spring/mass vibration absorber is attached to a vibrating body to absorb energy generated by that body, to minimize the transmission of vibrations to a structure in mechanical communication with the vibrating body. In one embodiment of the present invention, the mass of the vibration absorber may be adjusted, on-line, to compensate for sensed vibrations. A vibration sensor is connected to either the vibrating body or the attached structure so as to sense the level of vibration above a desired level and to send a signal representative of that vibration to an electronic controller. The electronic controller is designed to instruct the actuator to adapt the mass to compensate for the sensed vibration. In additional embodiments of the system, the stiffness of the spring, rather than the mass of the weight, may be adjusted on-line to "tune" the vibration absorber. Further, if more than one excitation frequency is present, a plurality of on-line adaptive and/or purely passive vibration absorbers may be cascaded so as to minimize vibrations due to a plurality of excitation frequencies. Depending on the number of vibration axes to be attenuated, one or a plurality of passive/adaptive vibration absorber elements may be used.

17 Claims, 14 Drawing Sheets

ADAPTIVE-PASSIVE VIBRATION CONTROL SYSTEM

BACKGROUND OF THE INVENTION

This invention relates generally to vibration control, and more specifically to a system of passive vibration control having adaptive elements.

There are many instances where undesired mechanical vibrations are transmitted through a structure or assembly of structures which are in mechanical communication. Dishwashers, refrigerators, satellite-antennae, heavy machinery, sensitive computer and other electronic equipment, electric generators in an RV or on a ship, stacks and mufflers, and engine-body structure of a vehicle are all examples of structures with vibrating bodies in communication with other structures.

Prior devices have attempted to reduce the amount of vibration in a system by designing passive mounting systems that are mechanically "tuned" to the vibrating body to ensure that system resonances do not occur at primary system operational frequencies, thereby reducing the amount of transmitted noise and vibrations. However, due to wear and tear of the mounting system over time, as well as changes in the dynamic characteristics of the vibrating body and the attached structure, the system may become "out of tune" and vibrations may surpass a desired threshold. Thus a purely passive mounting system, may not satisfy today's specifications.

Further, current industry trends, e.g., appliances and HVAC equipment, have focused on the development of variable speed industrial machinery applications in order to increase operational efficiency and prolong machinery life. As a result, it is no longer practical to seek to use passive elements "tuned" to fixed frequencies to reduce vibrations and noise over the entire operational frequency range.

Various publications and patents have introduced possible solutions in an attempt to solve the above described problems using active vibration control techniques. Others have proposed different techniques for either a modified controller or actuation mechanism or both to compensate for the present problem. However, many of the proposed techniques are designed to work with active noise control and may not be applicable to the vibration control problem. Active vibration control techniques are typically complex, expensive, and may not be economically feasible for many types of industrial machinery. Additionally, active control systems may, in fact, be beyond what is necessary to control vibrations in appliances, generator sets, compressors, etc.

There is a need for a vibration control system which overcomes the shortcomings of a purely passive system, while avoiding the complexity and expense of an active system, and, which is adaptive, on-line, to compensate for variations in system characteristics.

SUMMARY OF THE INVENTION

A vibration control system for minimizing the transmission of vibrations from a vibrating body to at least one structure in mechanical communication with the vibrating body is provided. In one embodiment a spring is connected to the vibrating body and a weight, having a variable mass, is connected to the spring. An actuator is in communication with the weight for the purpose of varying the mass of the weight. Additionally, a sensor is used to sense the vibrations present in the system due to the vibrating body. An electronic controller is connected to receive a signal from the sensor indicative of the sensed vibration, and to relay a control signal to the actuator to instruct the actuator to automatically adjust the mass of the weight in response to the level of the sensed vibrations.

In other embodiments a spring, the stiffness of which is variable over a continuum of stiffnesses, is connected to a vibrating body. A weight is connected to the spring. An actuator for varying the stiffness of the spring is provided. A sensor senses the level of vibration in the system due to the vibrating body and communicates information relating to the vibration in the system to an electronic controller. The controller then relays a control signal to the actuator to instruct the actuator to automatically adjust the stiffness of said spring in response to the sensed vibrations. In one particular embodiment, the spring is a mechanical spring in which the number of active springs used by the system is set by a stepper motor under the control of the electronic controller. In another embodiment, the spring includes an air spring, in which the air pressure is controlled by the electronic controller which operates a pump and release valve. In a further embodiment, strips of shape memory alloy are embedded in the spring material and are activated by a current source operated using signals obtained by the electronic controller.

Further, multiple embodiments of the present invention may be cascaded in order to minimize vibrations due to a plurality of excitation frequencies.

Other objects and advantages of the present invention will become apparent from the description of the preferred embodiments which follow.

DESCRIPTION OF THE PREFERRED EMBODIMENT

Figure 1:
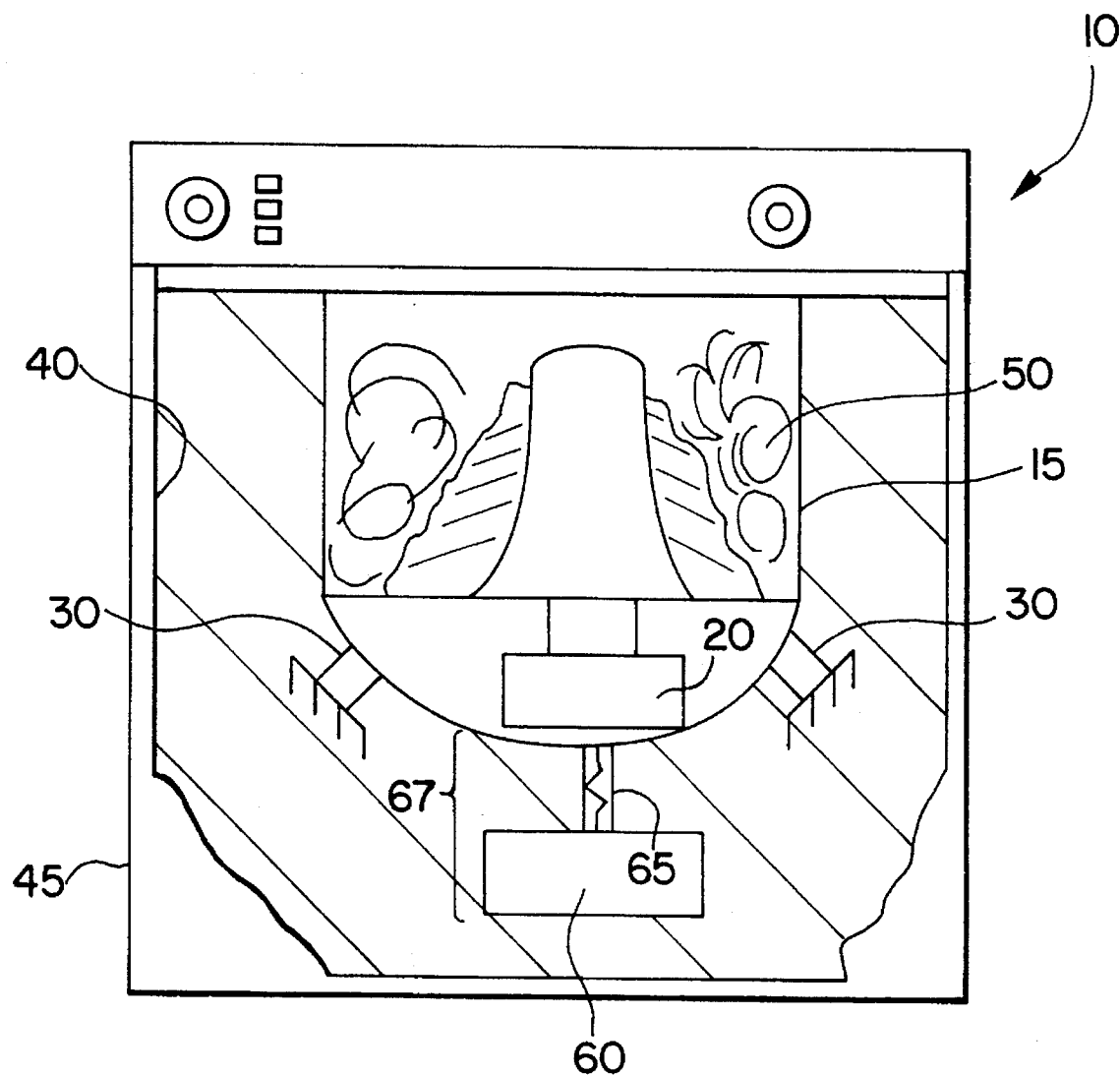
FIG. 1 is a front cross-sectional view of a prior art device having a purely passive vibration absorber incorporated therein.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In FIG. 1 there is shown a structure incorporating a prior art passive vibration absorption system which is tuned to absorb, and thus minimize transmission of, vibrations caused by a device such as rotating machinery or a vibrating body (motor, compressor, engine, etc.) operating at a single speed and generating an excitation at a single time varying excitation frequency. For the purposes of this disclosure, the term "vibrating body" is meant to include any body that is subject to vibrations, including rotating machinery, etc.

More specifically, FIG. 1 shows a laundry machine 10 having a laundry drum 15 including a motor 20 for operating the drum 15. The drum 15 is connected to the chassis 40 of the laundry machine 10 by body mounts 30. In operation, the laundry machine 10 may become unbalanced due to the presence of an imbalanced load 50 in the drum 15. This imbalance will cause mechanical vibrations to be transmitted throughout the laundry machine 10, as well as to an assembly of structures in mechanical communication with laundry machine 10.

As such, a purely passive vibration absorber 67, comprising a spring 65 and a weight 60, is connected to the drum 15, at which the undesired mechanical vibrations are generated. The spring constant k of spring 65 and the mass m of weight 60 are chosen off-line so as to mechanically "tune" the system to ensure that system resonances do not occur at a fixed primary system operational frequency, thus reducing the amount of transmitted noise and vibrations due to the drum. The tuned vibration absorber 67 will work to absorb vibrations caused by any imbalance within the drum 15.

Figure 2:
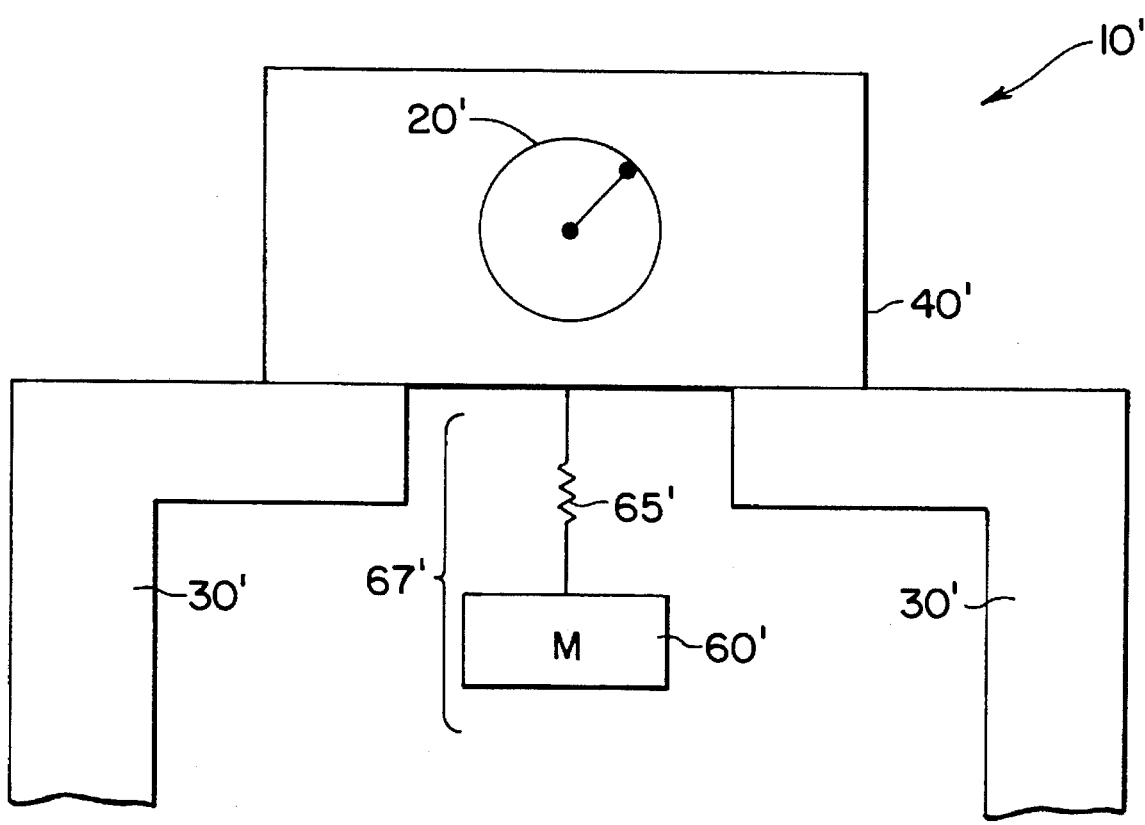
FIG. 2 is a front view of a system including a vibration absorber of the type shown in FIG. 1.
Figure 3:
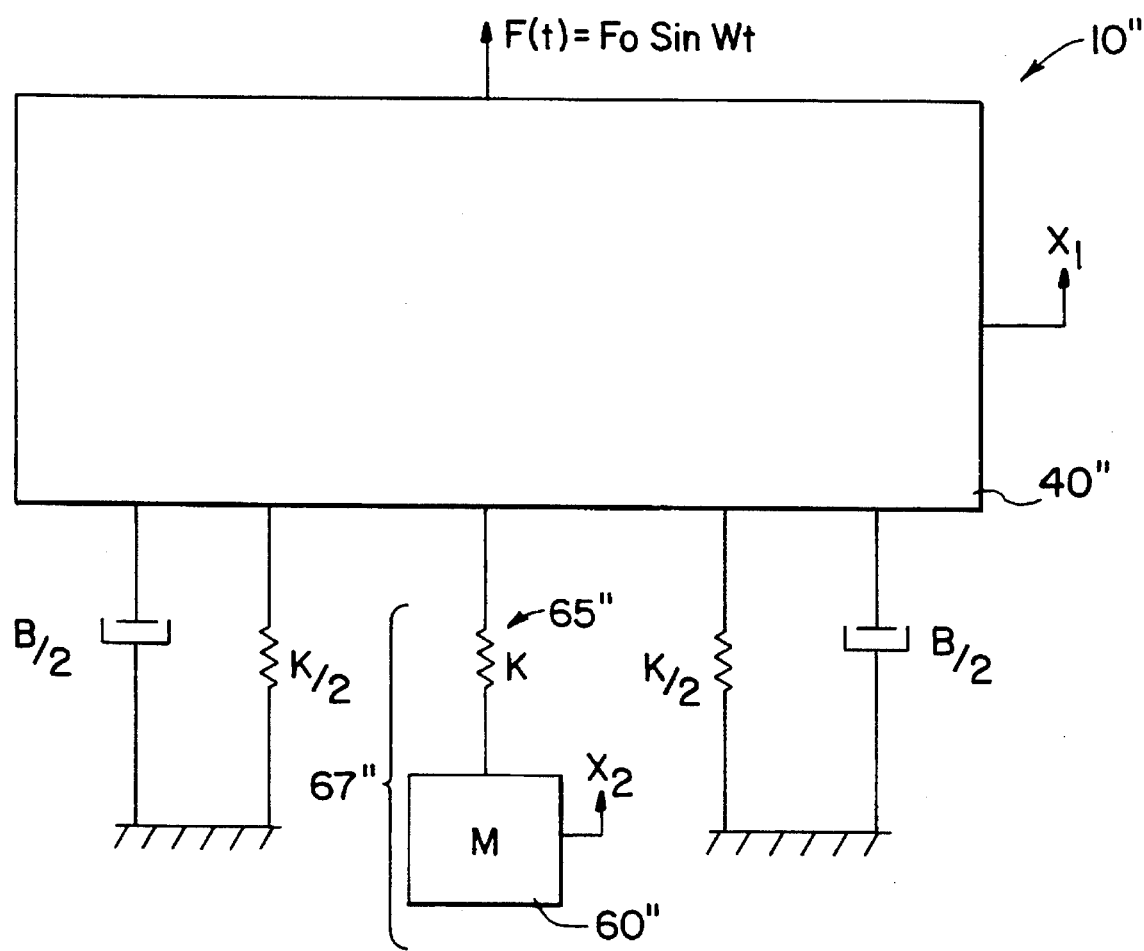
FIG. 3 shows the classical model of the system of FIG. 2 showing the forces acting on the vibrating body.

The structure of FIG. 1, as well as other types of systems including a vibrating body and a structure in mechanical communication with the vibrating body through a mounting structure, may generally be modelled as shown in FIGS. 2 and 3. More specifically, FIG. 2 shows a system 10' including a vibrating body 40' which is mounted to a structure 30'. Due to imbalances caused by the motor and/or load combination 20' an excitation is generated which vibrates both the vibrating body 40' and the structure 30', which is in mechanical communication with the vibrating body. Classically modelling the system of FIG. 2, it can be seen from FIG. 3 that there exists an excitation or vibration force $X_1$ in the system 10". Vibrating body 40" has a mass M, stiffness K, and damping force B. Note that K and B may be an equivalent stiffness and damping of the body and its mounting system and is illustrated as K/2 and B/2 in two locations. The vibration absorber 67" of the system 10" includes an equivalent spring 65" having a stiffness k and a weight 60" having a mass m. Based on the frequency domain analysis of this system, the following displacements for masses M and m result when an excitation F(t) is applied, wherein $F(t)=F_0\sin\omega t$.

$$\frac{X_1}{F} = \frac{k - m\omega^2}{\sqrt{[k(K - m\omega^2) - M\omega^2(k - m\omega^2) - k\omega^2(M + m)]^2 + B^2\omega^2(k - m\omega^2)^2}} \quad (1)$$

$$\frac{X_2}{F} = \frac{k}{\sqrt{[k(K - m\omega^2) - M\omega^2(k - m\omega^2) - k\omega^2(M + m)]^2 + B^2\omega^2(k - m\omega^2)^2}} \quad (2)$$

By choosing either $$k = m\omega^2 \quad (3)$$

or $$m = k/\omega^2 \quad (4)$$

the value of the excitation $X_1$ will be set to zero, thus there will be no vibration throughout the system. Instead the vibration absorber will absorb all of the energy produced by the excitation.

One problem with such devices is that past systems have assumed that the excitation frequency of the vibrating body will always be constant. Thus, prior art systems have attempted to cancel the vibration resulting from the excitation $X_1$ by tuning the system off-line to solve equations (3) or (4), resulting in constant values for the stiffness k and mass m of the system. The present invention is an adaptive-passive system wherein vibration cancellation will occur for possibly varying frequencies of a system, whether the differing frequencies are attributable to multiple variable motor speeds of the device or wear and tear in the system that tends to alter the excitation frequency or to some other cause. Namely the adaptive-passive systems of the present invention can alter the stiffness, k, and/or the mass, m, of the vibration cancellation system, on-line, to compensate for changing excitation frequencies.

Figure 4:
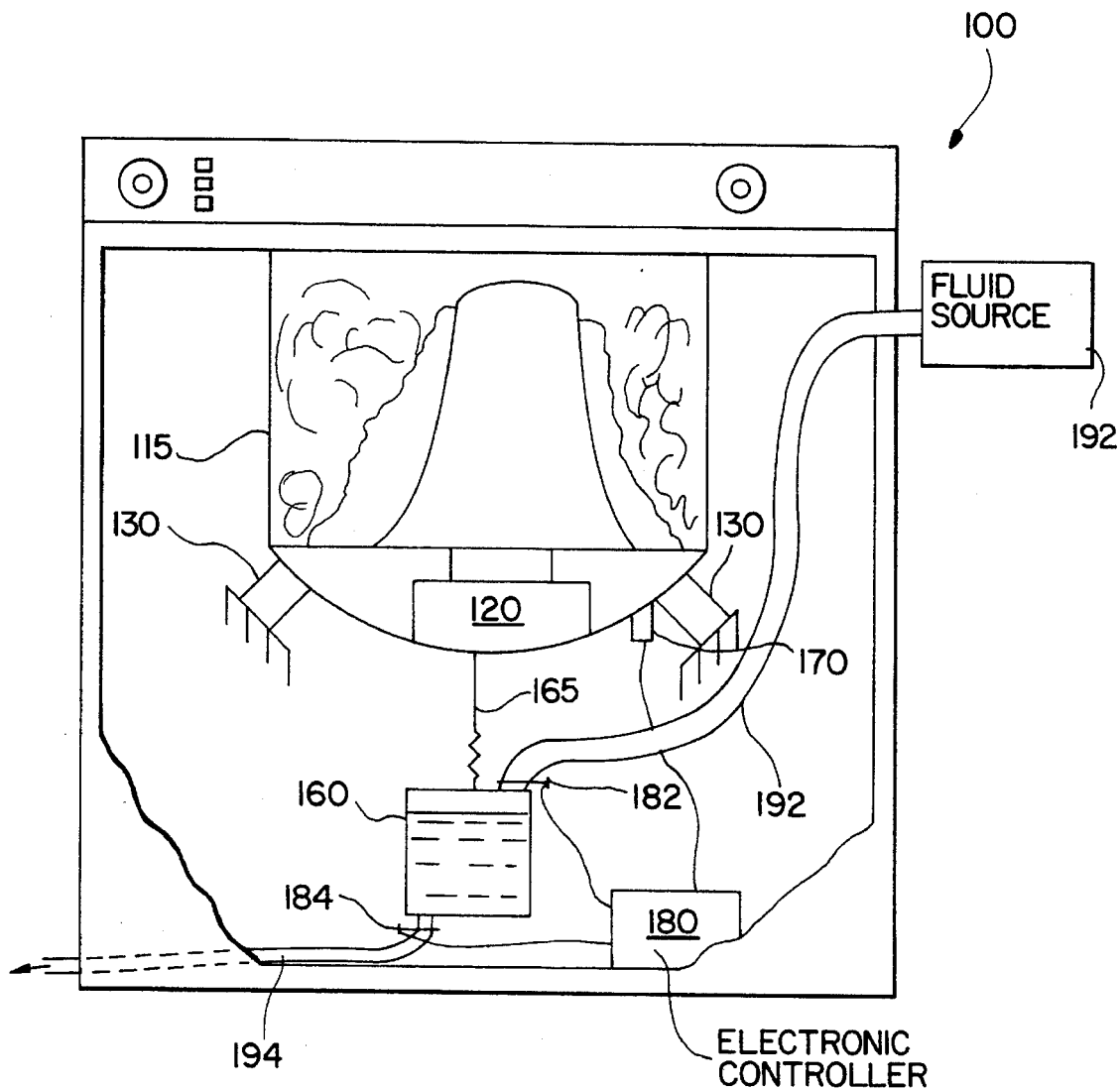
FIG. 4 is a front cross-sectional view of a device including an adaptive-passive vibration absorber having a spring/mass combination wherein the mass of a weight used in the vibration absorber may be adjusted on-line in accordance with one embodiment of the present invention.

In FIG. 4, there is shown one embodiment of the present adaptive-passive system invention wherein the mass portion of the spring/mass vibration absorber is adjusted on-line to compensate for vibrations detected in the system. These vibrations may be due to changing excitation frequencies caused by variable speed motors or other considerations, as discussed herein. The present embodiment is especially suited for use with systems dealing with hydraulics, e.g. laundry machines and hydraulic presses. However, other applications will become apparent from the descriptions provided herewith.

In FIG. 4, there is shown a laundry device 100, similar to that of FIG. 1, with one major difference being that the vibration absorber mass of the weight 160 is adjusted in response to detected vibrations. The laundry device 100 includes a drum 115 driven by a motor 120. Drum 115 is mechanically connected to the laundry machine 100 by body mounts 130. Further, a vibration sensor 170 is mounted to the drum 115 for measuring the amount of vibration produced at the drum 115. Alternatively, vibration sensor 170 may be located on the body of the laundry machine, in order to measure the amount of vibration actually transmitted to laundry machine 100. In the present embodiment, directly measuring the excitation frequency is unnecessary, e.g. measuring motor rpm. Rather, a vibration sensor 170, such as an accelerometer, is used as a feedback sensor to directly measure the amount of vibration occuring at the drum 115. In the alternative, the excitation frequency may be measured and used in the present invention in addition to or instead of a signal from a vibration sensor. For the purposes of illustration, a vibration sensor is used in all embodiments of the present invention. The vibration sensor 170 is electrically connected to an electronic controller 180, as well as to inlet valve 182 and outlet valve 184.

The weight 160 comprises an empty enclosed chamber of constant volume. The mass of weight 160 when empty is $m_oA$. The mass may be adjusted by adding or releasing fluid to the weight 160. Although the present embodiment uses fluid to change the mass of weight 160, other means may be used to change the mass, for example, sand may be added and removed from the weight. However, fluid is the preferred substance for use with the present embodiment. A fluid source 192 is connected via inlet hose 192 to the weight 160. The electronic controller 180 operates inlet valve 182 to control the amount of fluid permitted to flow into the weight 160 from the fluid source 192. Likewise, the electronic controller 180 operates outlet valve 184, which is connected to an outlet hose 194, to control the evacuation of fluid from the weight 160. Outlet hose 194 may be connected to a drain which is external to the laundry machine, or may alternatively drain into the same drainage channel as the laundry machine, or may further be pumped back into the fluid source container 192 using a pump (not shown).

The total mass of the weight 160, when filled with fluid, is initially chosen, off-line, based upon the lowest excitation frequency present in the system for which reduction is contemplated. The stiffness, k, of the spring is optimized for a medium value of the excitation frequency. In operation, if a vibration is detected by the feedback vibration sensor 170, the control circuitry operates either inlet valve 182 or outlet valve 184 to admit or release fluid from the weight 160, thus changing the mass of the weight 160 by adjusting the fluid mass $\Delta m$ portion of the total mass of the weight (total mass $m=m_0+\Delta m$, wherein $\Delta m$ is the mass of the fluid in the chamber 160). If the excitation frequency increases, the total mass, m, should be reduced. Thus outlet valve 184 is opened to reduce the $\Delta m$ portion of the total mass m of the vibration absorber. If the excitation frequency decreases, then the outlet valve is closed and the inlet valve is opened, causing an increase in the total mass, m of the vibration absorber. Thus the system can be adapted on-line to changes in the excitation frequency.

Figure 5:
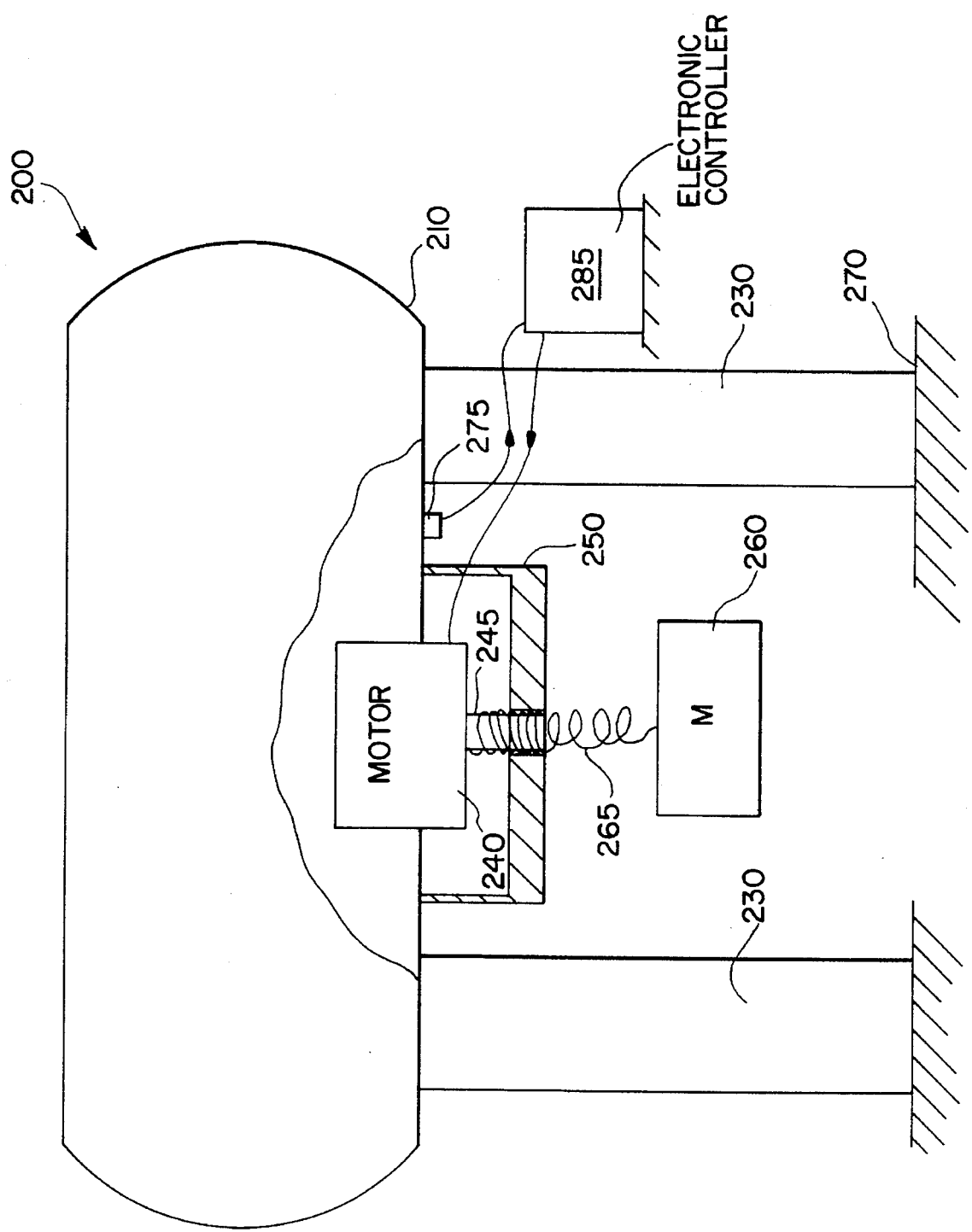
FIG. 5 is a front, partial cut-away view of a system including an adaptive-passive spring/mass type vibration absorber, wherein the stiffness of a mechanical spring may be adjusted on-line in accordance with another embodiment of the present invention.
Figure 6:
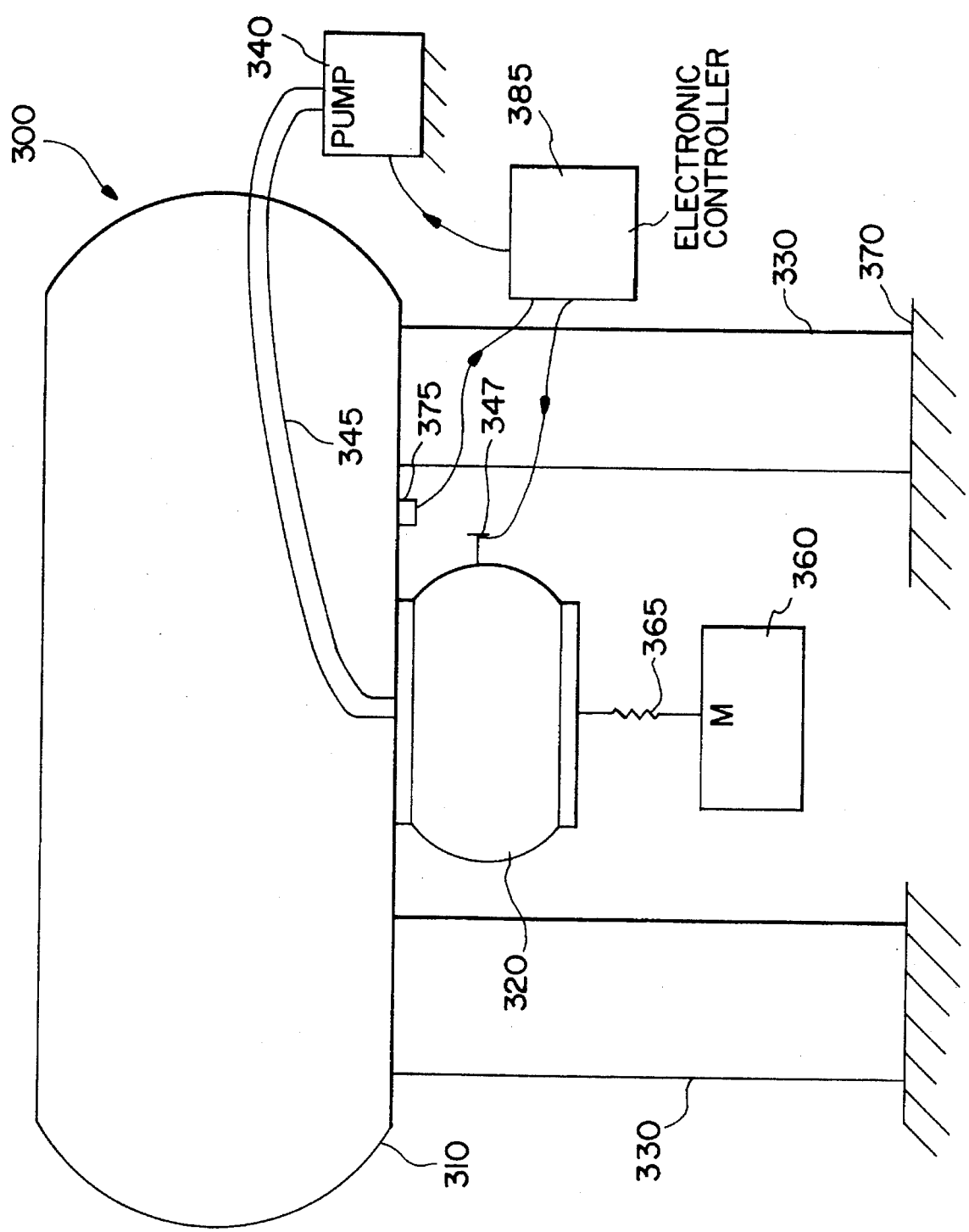
FIG. 6 is a front view of a system including an adaptive-passive spring/mass type vibration absorber, wherein the stiffness of a pneumatic spring may be adjusted on-line in accordance with another embodiment of the present invention.
Figure 7:
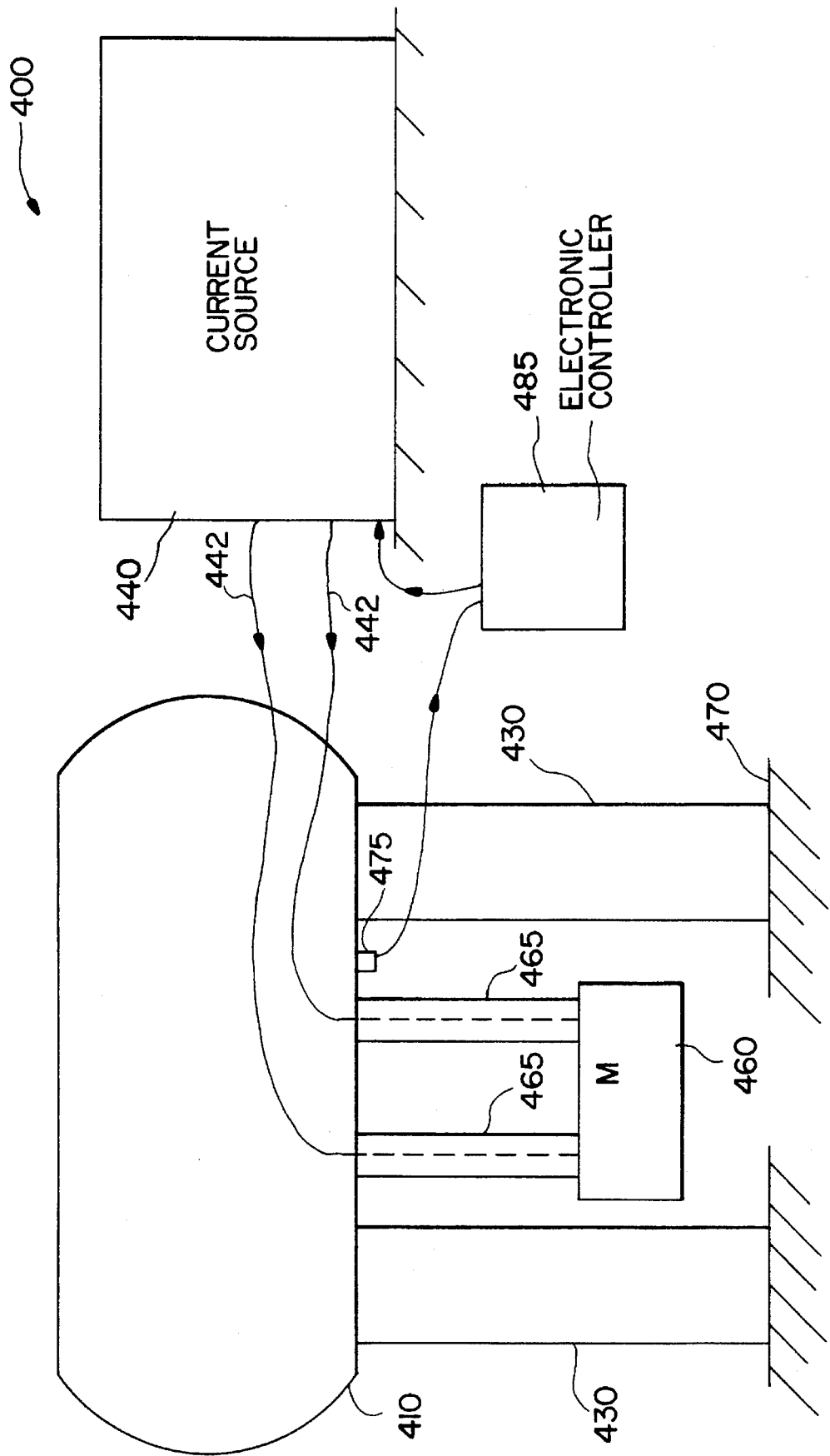
FIG. 7 is a front view of a system including an adaptive-passive spring/mass type vibration absorber, wherein the stiffness of a spring, which includes strips of a shape memory alloy, may be adapted on-line in accordance with another embodiment of the present invention.

FIGS. 5–7 show additional embodiments of the present invention wherein the stiffness, k, of the spring is adjusted to optimize the spring/mass vibration absorber. More particularly, FIG. 5 shows one embodiment of the present invention having a mechanical spring. In that embodiment, the stiffness, k, of the spring can be written as:

$$k = \frac{GD^4}{64R^3N} \tag{5}$$

Wherein D is the diameter of the coil wire, G is the shear modulus of the spring, R is the mean coil radius of the spring, and N is the number of active coils in the spring. Based upon equation (5), in order to change the stiffness, k, of the spring, and thus adapt the vibration absorber, on-line, the number of active coils in the system must be changed. FIG. 5 shows one embodiment of the present invention useful for changing the number of coils used in the vibration absorber, and thus changing the spring stiffness, k.

A vibrating body 210 (e.g. a drum of a laundry machine, a vehicle engine, a compressor, etc. ) is in mechanical communication with a structure 270, via mounts 230. A small stepper motor (or a DC motor) 240 is mounted to the vibrating body 210. A helical spring 265 is attached to the motor shaft 245 of the stepper motor 240 and is passed through a support bracket 250. A mass 260 is attached to the free end of an active spring 265. When the motor rotates in one direction (i.e. clockwise), it forces the upper section of the spring 265 to pass downward through the bracket 250, and, consequently, increases the number of active coils of the spring 265. According to equation (5), increasing the number of active coils will decrease the stiffness, k, of the spring 265. If the motor is driven in the opposite direction, it will retract coils of the spring up through the bracket 250, thus reducing the number of active coils and increasing the stiffness, k. The motor 240 is controlled by an electronic controller 285 which may be identical to that used in connection with the embodiment of FIG. 4. Similarly, a vibration sensor 275 may be connected to either the vibrating body or the structure mechanically connected to the vibrating body via the mounts 230, as described in connection with FIG. 4.

FIG. 6 shows a further embodiment 300 of the present invention wherein the stiffness, k, of the spring is adjusted to aid with vibration absorption and minimum vibration transmission. System 300 is similar to that of system 200 of FIG. 5 in that a vibrating body 310 is mechanically connected to a structure 370 via body mounts 330, and that a spring/mass combination is connected to the vibrating body for absorbing the vibration energy from the main structure of the device.

Likewise, a vibration sensor 375 may be connected to either the vibrating body 310, or to the base structure 370. Further, a controller 385 is used to adjust the stiffness, k, of the spring in response to a signal from the vibration sensor.

However, the present embodiment of the system 300 differs from that shown in FIG. 5 in that, instead of a purely mechanical spring, a pneumatic spring is used. An air pump 340 is used to increase the air pressure inside the air bag 320, which is the pneumatic spring. A discharge valve 347, controlled by the electronic controller 385, may be opened to reduce the air pressure. The stiffness of the pneumatic spring is given in terms of the air pressure as:

$$k = \frac{A^2nP}{V} \tag{6}$$

where P is the air pressure inside the air bag, V is the volume of the air bag, A is the contact area between the air bag and the vibrating body 310, and n is the polytropic constant. The electronic controller 385 is used to regulate the air pressure inside the air bag, and thus, the stiffness, k of the pneumatic spring.

In yet another embodiment of the present invention, shown in FIG. 7, a shape memory alloy type material may be embedded inside the spring portion of the vibration absorber. The shape memory material may be activated by an electric current generated by current source 440 in response to sensed vibrations. Strips of shape metal alloy springs 465 may be connected between the vibration absorber weight 460 and the vibrating body 410. A current source 440 would provide sufficient current to the shape metal alloy springs 465 via conductors 442 to change the stiffness, k, of the springs 465. Further, the number of shape memory alloy strips embedded in the spring material and connected to the current source may be varied such that current may be selectively supplied by the current source 440 to particular strips, as determined by a signal from the controller, so that the stiffness of the springs may be adjustable in a continuous, rather than a discrete manner. For example, the stiffness of the springs 465 may be varied along a continuum of stiffnesses depending on the number and location of embedded shape memory alloy strips to which the current is supplied (e.g. four out of eight strips in each spring activated such that every other strip is relaxed). Further, it may be possible to continuously, rather than discretely, change the stiffness of the springs by varying the level of applied current so as to prevent a complete martinsite transition of the shape memory material, and thus vary the stiffness. As with the previously described embodiments, the signal generated by the electronic controller 485 is in response to a vibration signal obtained from a vibration sensor 475.

Additionally, it is possible that a vibrating body may be excited by two independant, time varying frequencies. As such the excitation force may be written as:

$$F(t) = A\sin\omega_1 t + B\sin\omega_2 t$$

Figure 8:
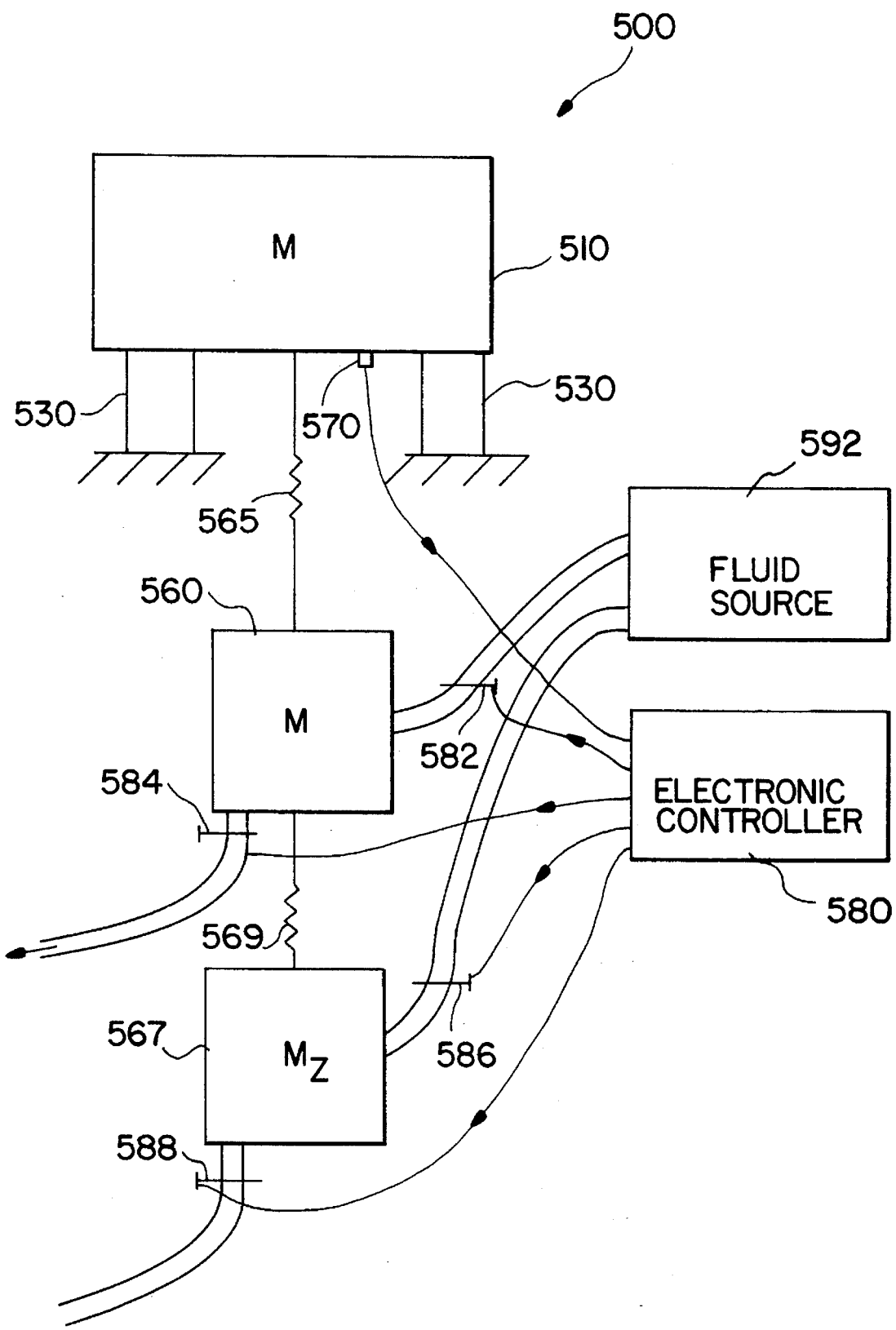
FIG. 8 is a front view of a system including at least two adaptive-passive spring/mass type vibration absorbers, cascaded in series, in accordance with a further embodiment of the present invention.

In cases where two such independent time varying frequencies exist, the adaptive-passive vibration absorber of the present invention may be adapted to include two adaptive vibration absorbers cascaded in series or placed along the same vibration axis. FIG. 8 shows one such system wherein two vibration absorbers of the type described in connection with FIG. 4 are connected in series to provide for the absorption of vibrations at two separate excitation frequencies. Other combinations of variable mass and/or variable stiffness vibration absorbers may be used. For example, a multiple frequency vibration absorber may be chosen to include a variable spring stiffness/constant mass type vibration absorber, as described in connection with FIGS. 5–7, cascaded with a variable mass/constant spring stiffness type vibration absorber. As such, cascaded adaptive passive vibration absorbers may be implemented using various combinations of classical systems and the embodiments described in FIGS. 4–7. Furthermore, it should be noted that an adaptive vibration absorber may be composed of both adaptive stiffness and adaptive mass components.

Figure 9:
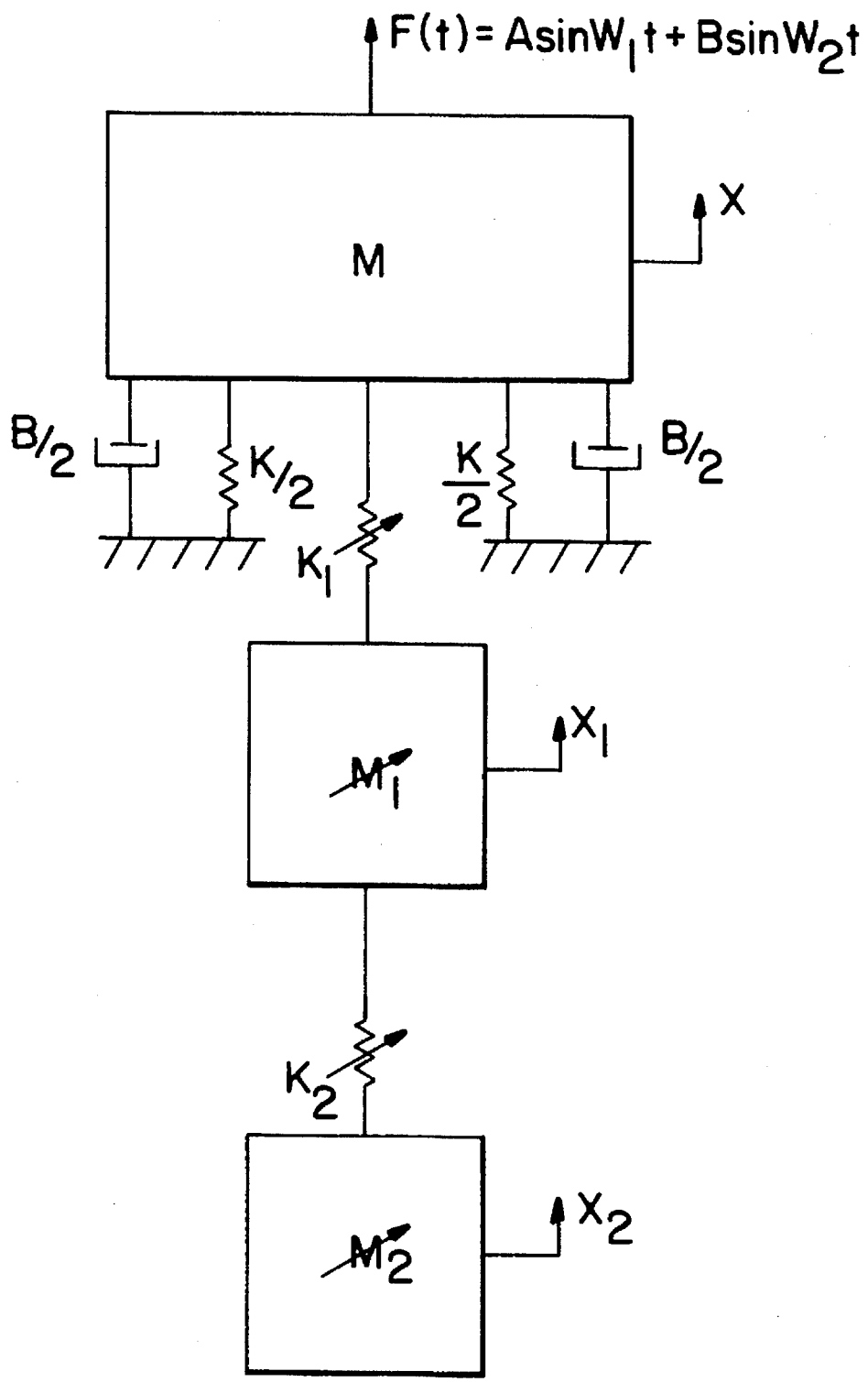
FIG. 9 is a classical model of a system including at least two adaptive-passive spring/mass type vibration absorbers, cascaded in series, in accordance with an additional embodiment of the present invention.

FIG. 9 is a classical representation of a system, such as is shown in FIG. 8, wherein multiple vibration absorbers are cascaded to act on multiple excitation frequencies present in the system. More particularly, FIG. 9 shows two adaptive vibration absorption systems cascaded in series. Using transfer function analysis, the following can be found:

$$\frac{X}{F} = \frac{(m_2 S^2 + k_2)(m_1 S^2 + k_1 + k_2) - k_2^2}{(MS^2 + BS + k_1 + K)[(m_2 S^2 + k_2^2)(M_1 S^2 + k_1 + k_2) - k_2^2] - k_1^2} \quad (7)$$

For complete absorption of the vibration from the vibrating body having mass M, and based on an F(t) having two distinct and variable excitation frequencies $\omega_1$ and $\omega_2$, the following must be satisfied:

$$(k_1 - m_1\omega_1^2)(k_2 - m_2\omega_1^2) = k_2 m_2 \omega_1^2 \quad (8)$$

$$(k_1 - m_1\omega_2^2)(k_2 - m_2\omega_2^2) = k_2 m_2 \omega_2^2 \quad (9)$$

If using an adaptive spring is desired, then the resulting stiffnesses may be found by:

$$k_1 = \frac{m_1 \omega_2^2}{2} [(1+\alpha^2) - \sqrt{(1-\alpha^2)^2 - 4\beta\alpha^2}\,] \quad (10)$$

$$k_2 = m_2 \omega_2^2 \frac{(1-\alpha^2) - \sqrt{(1-\alpha^2)^2 - 4\beta\alpha^2}}{(1-\alpha^2) - \sqrt{(1-\alpha^2)^2 - 4\beta\alpha^2 + 2\beta}} \quad (11)$$

where $\alpha = \frac{\omega_1}{\omega_2}$ and $\beta = \frac{m_2}{m_1}$

To guarantee physically realizable values for these stiffnesses, the following should be satisfied:

$$\alpha < 1 \quad \Rightarrow \quad \omega_2 > \omega_1$$

$$\beta < \frac{1-\alpha^2}{2\alpha} \quad \text{or } m_2 < m_1 \quad \left(\frac{\omega_2}{2\omega_1} - \frac{\omega_1}{2\omega_2}\right)$$

For cases wherein the mass is adapted for changes in frequency, then the following equations should be used.

$$m_1 = \frac{k_1}{\omega_2^2} \left[1 - \frac{2\gamma}{(\alpha^2 - 1)^2 + \sqrt{(\alpha^2 - 1)^2 - 4\gamma\alpha^2}}\right] \quad (12)$$

$$m_2 = \frac{2k_2}{\omega_2^2 [(\alpha^2 - 1)^2 + \sqrt{(\alpha^2 - 1)^2 - 4\gamma\alpha^2}\,]} \quad (13)$$

and $\gamma = \frac{k_1}{k_2}$

For either of the above cases, cascaded adaptive vibration absorbers may be implemented using a combination of designs described in FIGS. 4–7 of the present invention. Furthermore, it should be noted again that an adaptive vibration absorber can be comprised of both adaptive stiffness and adaptive mass components. This may be seen in FIG. 9, wherein it is represented that any or all of the stiffnesses of the springs, $k_1$ or $k_2$, or the masses of the weights, $m_1$ or $m_2$, may be varied. As such, a hybrid of individual designs described in FIGS. 4–8 may be used.

Figure 10:
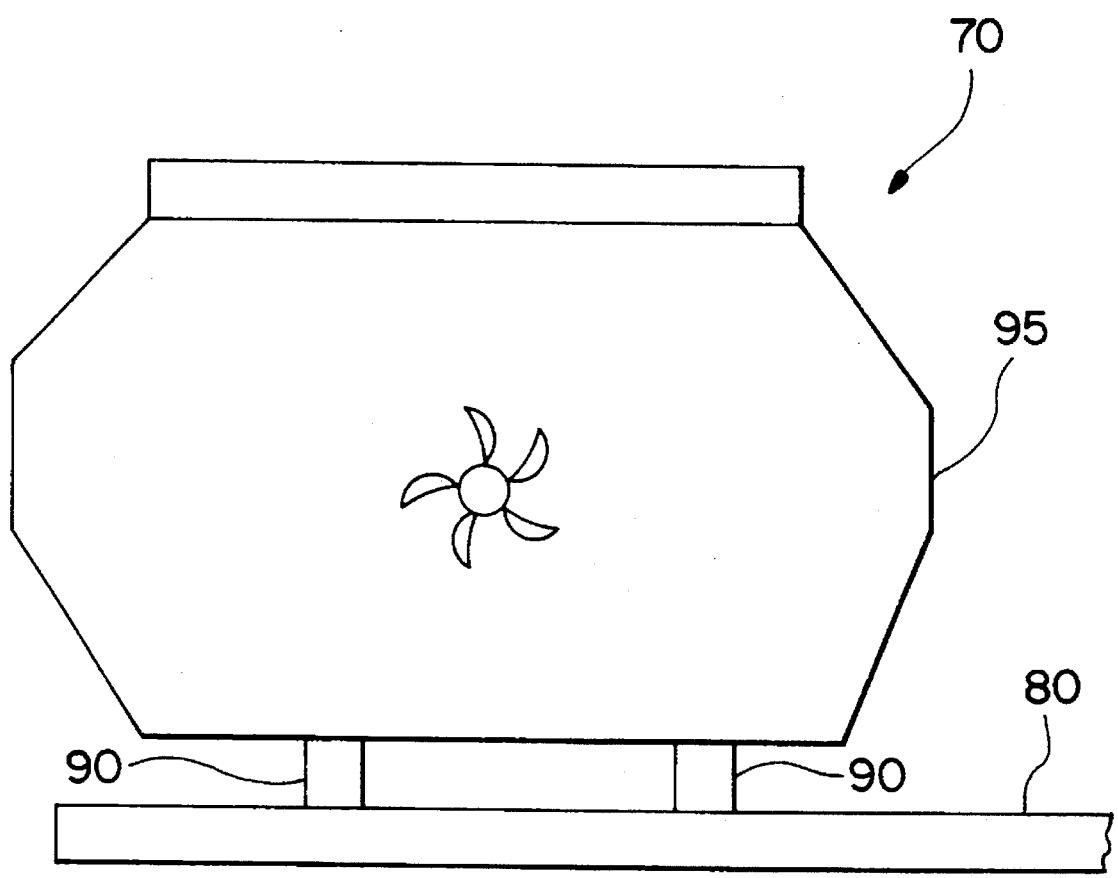
FIG. 10 is a front view of a system having a vibrating body in mechanical communication with a structure, via mounting brackets.

In one example of the use of the present invention, there is shown in FIG. 10 a vehicle type system 70, wherein a vehicle engine 95 is separated from the vehicle body 80 by means of engine mount 90. The system shown in FIG. 10 could easily represent other su. systems, for example, the system 70 of FIG. 10 may represent a compressor 95 of an air conditioning unit 80 which is separated from the housing of the air conditioning unit by rubber mounts 90. In this type of system the vibrating body is separated from the main structure by means of an intermediate body or mounting system. The objective of the intermediate body is to minimize the transmission of vibration from the vibrating body to the main structure. As discussed herein, if the frequency of the vibrating body is variable, then passive mounts will not be effective to minimize vibration transmission over the entire frequency spectrum. As such, some form of adaptive mounts are desirable.

Figure 11:
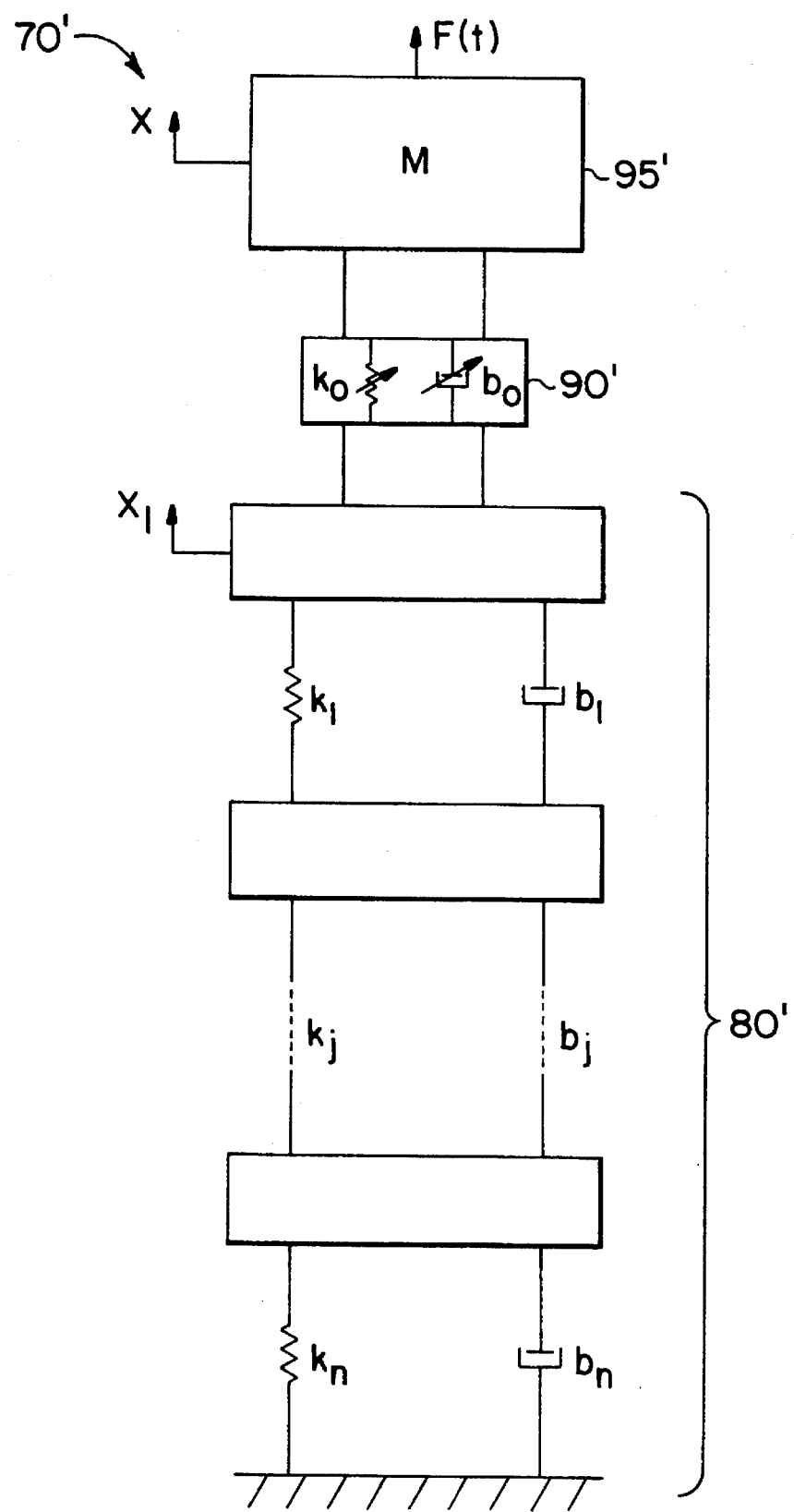
FIG. 11 is a classical representation of the system shown in FIG. 10, showing the forces acting upon the vibrating body.

In general, the system of FIG. 10 may be modelled as a system 70' composed of three bodies (a vibrating body, a mounting system, and a main structure), as shown in FIG. 11. The main structure 80'is composed of several vibrational modes which are coupled together, and the vibrating body 95' is assumed to be rigid with a mass M.

In the system of FIG. 11, the impedance (complex resistance) to motion of the main structure may be represented as:

$$Z = Z_1 + jZ_2 \qquad (14)$$

where $Z_1$ is the real part and $Z_2$ is the imaginary part of the impedance. The transmissibility of such a system 70' is given as:

$$T \triangleq \frac{k_o(x - x_1) + b_o(\dot{x} - \dot{x}_1)}{F(t)} \qquad (15)$$

When trying to reduce the transmissibility, T, it can be shown that $\delta T/\delta k_o$ and $\delta T/\delta b_o$ do not lead into any relationships that and $k_o$ and $b_o$. Thus to find the optimal values of $k_o$ and $b_o$, it is necessary to maximize the term $(1-T)^2$. Maximizing $(1-T)^2$ results in the following equations for optimal mounting system:

$$k_o = \frac{1 - M^2\omega^4 + M(1 - Z_1)\omega^2}{1 - 2M\omega^2 Z_1 + M^2(Z_1^2 + Z_2^2)\omega^4} \qquad (16)$$

$$b_o = \frac{M\omega Z_2(1 + M\omega^2)}{1 - 2M\omega^2 Z_1 + M^2(Z_1^2 + Z_2^2)\omega^4} \qquad (17)$$

$Z_1$ and $Z_2$ may be obtained from a modal analysis of the main structure. In the case of a structure with two modes $(\omega_1, \xi_1)$ and $(\omega_2, \omega_2)$, Z is given by:

$$Z = \frac{k_1 + k_2 - m_2\omega^2 + j\omega(b_1 + b_2)}{(-\omega^2 + \delta W_2^2 + 2j\xi_2\omega\omega_2)(\omega_1^2 - \omega^2 + 2j\xi_1\omega\omega_1)} \qquad (18)$$

Figure 12:
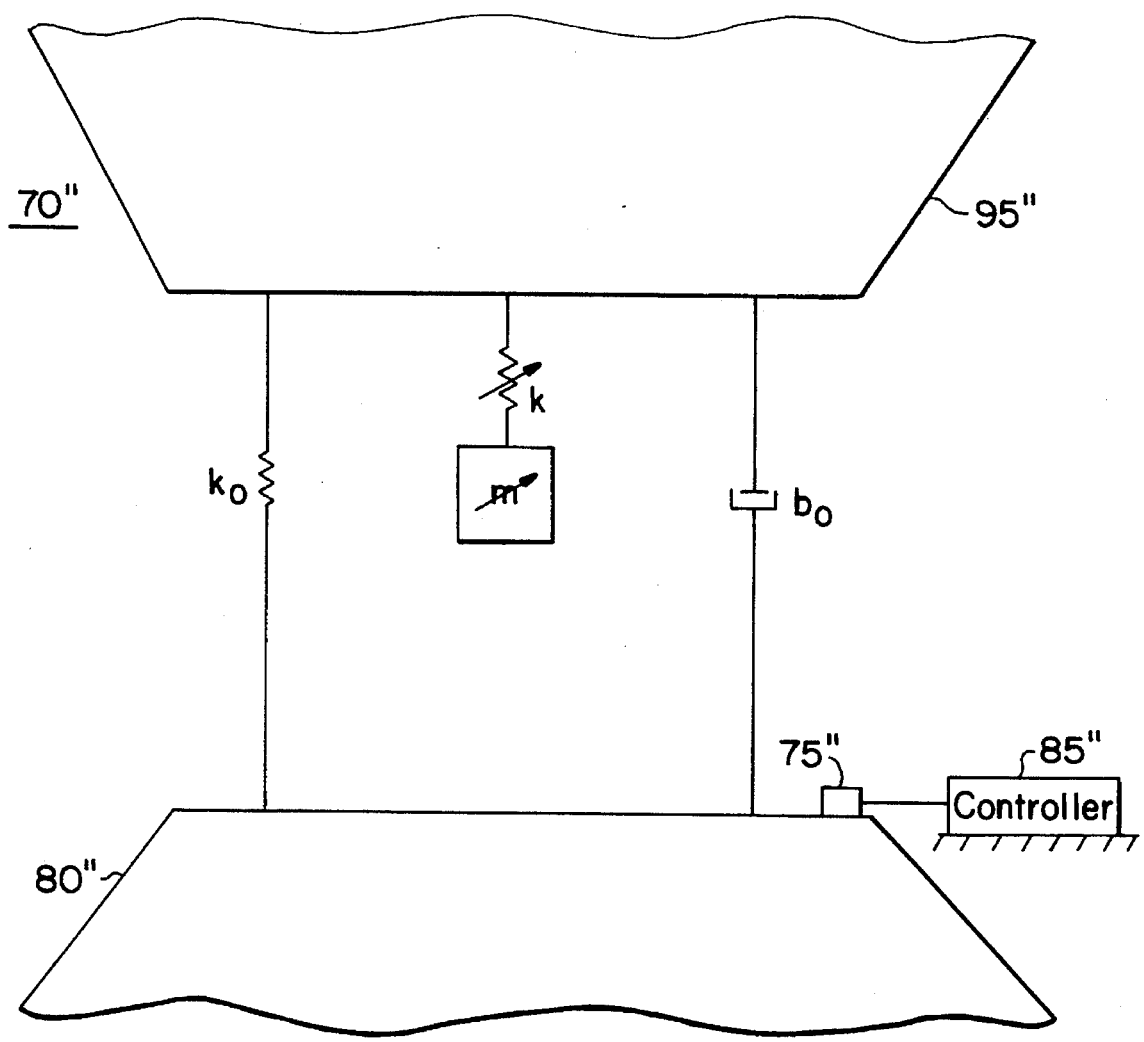
FIG. 12 is a system having a vibration absorber in accordance with an additional embodiment of the present invention.

The spring stiffness $k_o$, may be adjusted employing a variable spring stiffness embodiment of the present invention, as described herein. However, prior art systems have adjusted the damping force using electro-rheological (E-R) fluid, shape memory alloys, or a hydraulic damper with a variable orifice. These systems have been studied by the inventor and others, and seem too complex. This invention uses a design for an adaptive mount as shown in FIG. 12.

Based on a nominal vibrating frequency and off-line modal analysis of the main structure, the passive mount characteristics ($k_o$, $b_o$) may be derived from equations (16) and (17), and passive mounts having those characteristics may be embedded in the passive mount or connected in parallel with an adaptive vibration absorber. The present vibration absorber may be adapted on-line using the designs of FIGS. 4–7 by means of an electronic controller 85". A vibration sensor 75"connected to the main structure is used as a feedback sensor to feed a signal representative of the vibration sensed at the chassis 80" to the electronic controller 85". There are Using optimized $k_o$ and $b_o$ and passive elements reduces the several advantages of this design over active mount systems. amount of effort the vibration absorber must exert to absorb the optimized $k_o$ and $b_o$. At the same time a simple and the vibration. Further, any static loading is taken care of by inexpensive design for an adaptive vibration absorbing system is used to compensate for unexpected variations in the system.

Figure 13:
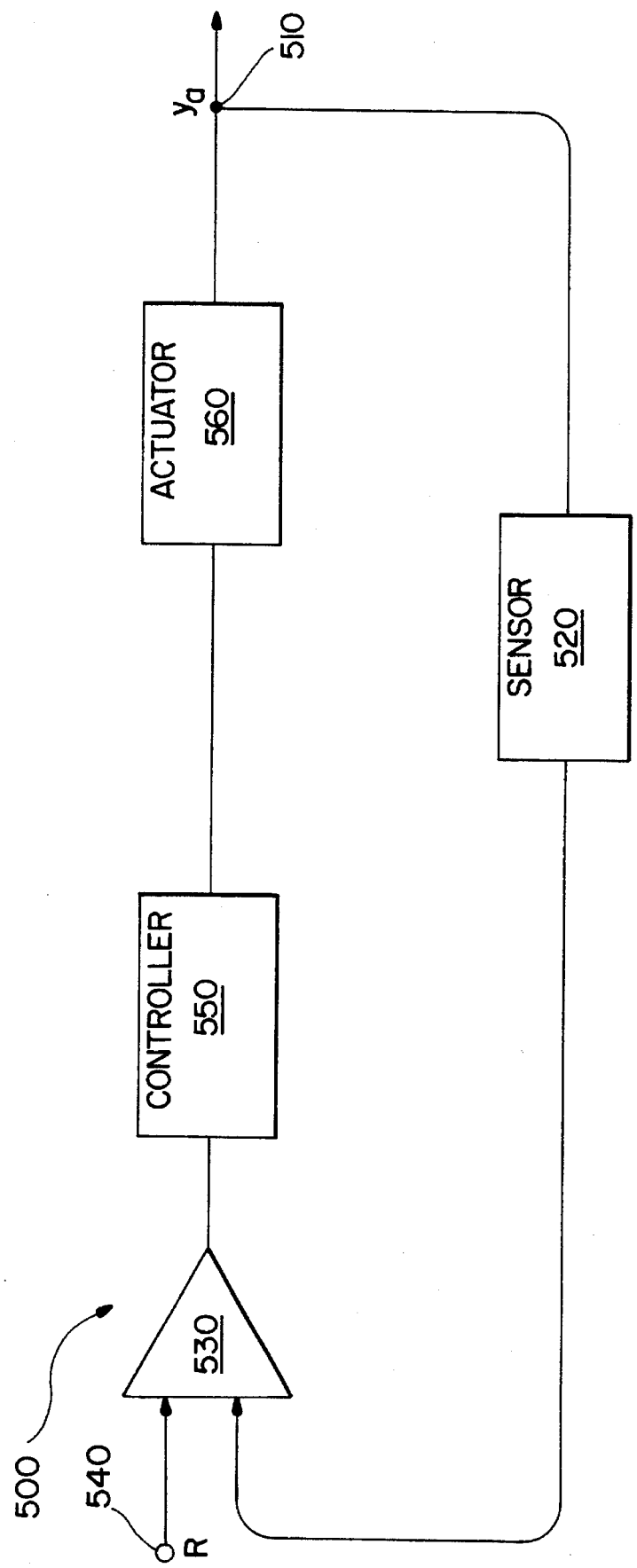
FIG. 13 is a block diagram of the control logic used in the present invention.

In all embodiments described herein, an electronic controller is used to adaptively tune the vibration absorber, on-line. FIG. 13 shows a block diagram of the control system 500 used in all embodiments of the present invention. The control system of FIG. 13 may be implemented using analog circuitry.

Figure 14:
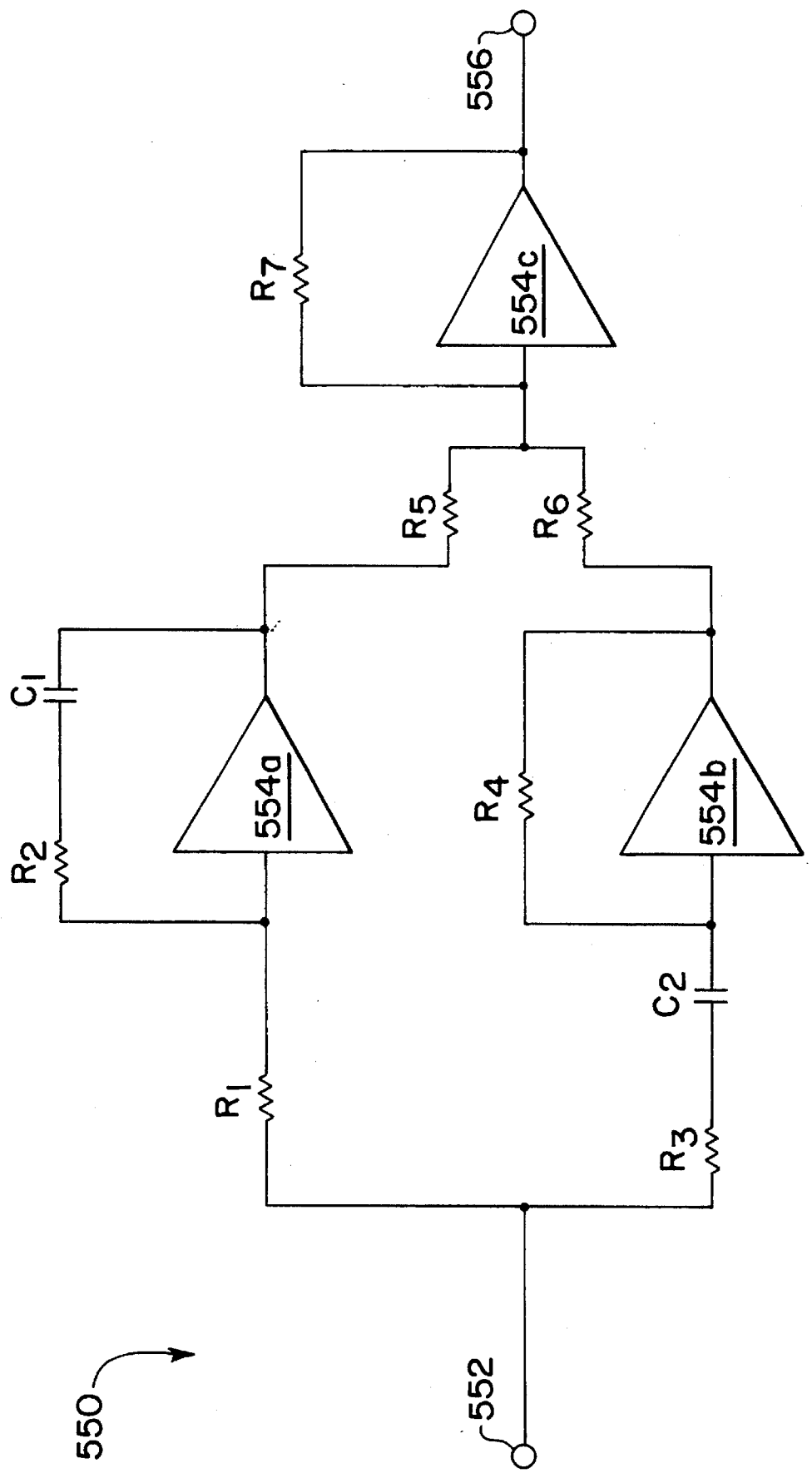
FIG. 14 is a schematic diagram of one embodiment of an electronic controller for use with the present invention.

First, a vibration signal, $Y_a$, is obtained from a point 510 on either the vibrating body or the structure. This vibration signal is obtained by vibration sensor. 520, which may be a device such as an accelerometer. A signal representing the vibration is sent from the vibration sensor 520 to a comparator 530, where the actual vibration level, $Y_a$ is compared to a desired threshold level of vibration, threshold R. Threshold R is input to the comparator using input 540. The resulting signal from the comparator 530 is sent to the controller 550. One version of the circuitry for controller 550 is shown in FIG. 14. The resulting control signal from the controller 560 is used to operate the actuators shown in FIGS. 4–7. For example, this signal will drive the inlet and outlet flow valves in FIG. 4, or drive the motor in FIG. 5, etc. It should be noted that with this control design, there is no need for an on-line microprocessor. This system can be implemented in electronic circuitry using analog components. However, if the structure, e.g., automobile or a refrigerator, already has an on-board microprocessor, then more sophisticated control logics, including a fuzzy controller can be incorporated.

FIG. 14 shows a schematic diagram of one possible embodiment of the electronic controller 550. The controller 550 has three operational amplifiers creating a three term control action. Other control circuits may be used. The controller need only send an appropriate control signal to the actuator 560, which may be interpreted by the actuator to operate a device in order to optimize the vibration absorber characteristics in the system.

While the invention has been illustrated and described in detail in the drawings and foregoing description, the same is to be considered as illustrative and not restrictive in character. For example, the present invention is described in connection with vehicle engines, washing machines and bodies incorporating compressors. However, this is not meant to be limiting. Dishwashers, refrigerators, satellite-antenna, heavy machinery, sensitive computer and other electronic equipment electric generators in an RV or on a ship or on board of an aircraft, fighter craft, or any civil structures and buildings, stacks and mufflers, and engine-body structure of a vehicle are all examples of structures with vibrating bodies and an assembly of other bodies are all examples of structures with which the present invention, as shown in the various embodiments herein, may be used. It is being understood that only the preferred embodiments has been shown and described and that all changes and modifications that come within the spirit of the invention are desired to be protected.

What is claimed is:

1. A vibration filtering/absorbing control system for minimizing the transmission of vibrations from a vibrating body to at least one structure in mechanical communication with the vibrating body, comprising:

a first spring/mass vibration controlling system including a first spring and a first weight connected to said spring forming a combined vibration filtering/absorbing means;

said vibration filtering/absorbing means connected to said vibrating body:

an actuator means for varying the mass of said weight and/or the stiffness of said spring;

a sensor for sensing the vibration in the vibrating body and/or in the structure connected to the vibrating body, said sensor providing a variable output feedback signal corresponding to the sensed vibration; and an electric controller connected to receive said feedback signal from said sensor indicative of the sensed vibration and to relay a control signal to said actuator, said sensor and controller thereby forming the adaptive portion of an adaptive-passive vibration filter/absorber and said controller instructing said actuator to automatically adjust the spring/mass system in a manner to minimize the sensed vibrations.

2. The vibration control system of claim 1, wherein said sensor directly senses the excitation frequency of said vibrating body.

3. The vibration control system of claim 1, wherein said sensor is a vibration sensor, and is connected to said controller in a feedback loop.

4. The vibration control system of claim 3, wherein said weight includes a chamber of constant volume, said weight having a mass of $m_o$.

5. The vibration control system of claim 4, additionally including a fluid source in fluid communication with said chamber of said weight, and wherein said mass of said weight is varied by adjusting the amount of fluid in said chamber.

6. The vibration control system of claim 5, wherein said actuator comprises:

at least one inlet valve, for admitting fluid from said fluid source into said chamber in response to a command from said electronic controller to said inlet valve; and at least one outlet valve, for evacuating fluid from said chamber in response to a signal from said electronic controller to said outlet valve.

7. The vibration control system of claim 1 additionally comprising:

a second spring, connected in series with said first spring; and a second weight connected to said second spring.

8. The vibration control system of claim 7, wherein said second weight has a variable mass.

9. The vibration control system of claim 7, wherein said second spring has a variable stiffness.

10. A vibration control system for minimizing the transmission of vibrations from a vibrating body to at least one structure in mechanical communication with the vibrating body, comprising:

a mechanical spring;

a motor, including a motor shaft, said mechanical spring being attached to the motor shaft;

a support bracket through which a first end of the spring is passed;

a weight connected to the first end of said spring;

a sensor for sensing the vibration in the system due to the vibrating body; and an electronic controller connected to receive a signal from said sensor indicative of said sensed vibration and to relay a control signal to said motor to instruct said motor to automatically adjust the stiffness of said spring in response to said sensed vibrations;

wherein rotation of the motor in a first direction forces the upper section of the spring to pass downward through the bracket and increase the number of active spring coils; and wherein rotation of the motor in a second direction retracts coils of the spring back upward through said bracket, thus reducing the active number of spring coils.

11. The vibration control system of claim 10, wherein said motor is a stepper motor.

12. A vibration control system for minimizing the transmission of vibrations from a vibrating body to at least one structure in mechanical communication with the vibrating body, comprising:

a spring, including a pneumatic spring comprising an air bag, the stiffness of which is variable over a continuum of stiffnesses, said spring being connected at a first end to the vibrating body;

a weight connected to a second end of said spring;

an actuator for varying the stiffness of said spring, comprising a pump for increasing the air pressure within said air bag, and a release valve for reducing the air pressure within said air bag;

a sensor for sensing the vibration in the system due to the vibrating body; and an electronic controller connected to receive a signal from said sensor indicative of said sensed vibration and to relay a control signal to said actuator said sensor and controller thereby forming the adaptive portion of an adaptive-passive vibration filter/absorber and said controller instructing said actuator to automatically adjust the stiffness of said spring in response to said sensed vibrations.

13. The vibration control system of claim 12, wherein said spring additionally includes a mechanical spring connected to said air bag.

14. A vibration control system for minimizing the transmission of vibrations from a vibrating body to at least one structure in mechanical communication with the vibrating body, comprising:

a spring, the stiffness of which is variable over a continuum of stillnesses, said spring being connected at a first end to the vibrating body;

a weight connected to a second end of said spring;

an actuator for varying the stiffness of said spring;

a sensor for sensing the vibration in the system due to the vibrating body;

an electronic controller connected to receive a signal from said sensor indicative of said sensed vibration and to relay a control signal to said actuator said sensor and controller thereby forming the adaptive portion of an adaptive-passive vibration filter/absorber and said controller instructing said actuator to automatically adjust the stiffness of said spring in response to said sensed vibrations; and wherein said spring includes at least one strip of a shape memory alloy, and wherein said actuator includes a current source, electrically connected to said at least one strip of shape memory alloy, said current source for applying a current to said shape memory alloy for changing the stiffness of said alloy and said spring.

15. A vibration control system for minimizing the transmission of vibrations from a vibrating body to at least one structure in mechanical communication with the vibrating body, comprising:

a mechanical spring connected to the vibrating body;

a weight, including a chamber of constant volume, connected to said spring;

a fluid source in communication with said chamber;

an inlet valve for admitting fluid from said fluid source to said chamber;

an outlet valve for releasing fluid from said chamber;

a vibration sensor for sensing the vibration in the system due to the vibrating body; and an electronic controller connected to receive a signal indicative of sensed vibrations above a reference vibration level, and to relay control signals to said inlet and said outlet valves to automatically adjust the fluid level in said chamber in response to said sensed vibrations, said sensor and controller thereby forming the adaptive portion of an adaptive-passive vibration filter/absorber.

16. A vibration control system for minimizing the transmission of vibrations from a vibrating body to at least one structure in mechanical communication with the vibrating body, comprising:

a first vibration absorber, including a first spring and a first weight;

a second vibration absorber connected in series with said first vibration absorber, including a second spring and a second weight;

at least one vibration sensor, for sensing vibrations present due to said vibrating body;

an electronic controller connected to receive a signal indicative of the sensed vibrations from said vibration sensor said sensor and controller thereby forming the adaptive portion of an adaptive-passive vibration filter/absorber;

wherein said series combination of said first vibration absorber and said second vibration absorber is connected to the vibrating body; and wherein at least one of the stiffness of said first spring and the mass of said first weight may be varied in response to said sensed vibrations.

17. The vibration control system of claim 16, wherein at least one of the stiffness of said second spring and the mass of said second weight may additionally be varied in response to said sensed vibrations.

* * * * *